(12) United States Patent
Burritt et al.

(10) Patent No.: US 7,432,951 B1
(45) Date of Patent: Oct. 7, 2008

(54) VIDEO-TELEPHONY INTEGRATION

(75) Inventors: David R. Burritt, Broomfield, CO (US);
Matt Jerome Stevens, Northglenn, CO (US); Roger L. Toennis, Arvada, CO (US)

(73) Assignee: Avaya Technology Corp., Basking Ridge, NJ (US)

( * ) Notice: Subject to any disclaimer, the term of this patent is extended or adjusted under 35 U.S.C. 154(b) by 744 days.

(21) Appl. No.: 10/825,548

(22) Filed: Apr. 14, 2004

Related U.S. Application Data (60) Provisional application No. 60/558,637, filed on Mar. 31, 2004.

(51) Int. Cl.
*H04N 7/14* (2006.01)

(52) U.S. Cl. ............... 348/14.08; 348/14.01; 348/14.11

(58) Field of Classification Search ... 348/14.01–14.09, 348/14.1, 14.11, 14.12, 14.13
See application file for complete search history.

(56) References Cited

U.S. PATENT DOCUMENTS

| | | | |
|---|---|---|---|
| 5,757,781 A | 5/1998 | Gilman et al. | 370/260 |
| 5,760,823 A | 6/1998 | Brunson et al. | 348/14 |
| 6,831,675 B2 * | 12/2004 | Shachar et al. | 348/14.08 |
| 2002/0083462 A1 * | 6/2002 | Arnott | 725/100 |

* cited by examiner

*Primary Examiner*—Melur Ramakrishnaiah
(74) *Attorney, Agent, or Firm*—Sheridan Ross P.C.

(57) ABSTRACT

An integrated video-telephony system is provided. The system allows a video communication session to be established to complement an audio communication session when communication devices or endpoints associated with the audio communication session are also video communication enabled. By coordinating the establishment of separate audio and video communication channels, integrated video-telephone communication sessions can be provided, without requiring the use of specialized communication servers or dedicated video telephone devices.

26 Claims, 4 Drawing Sheets

VIDEO-TELEPHONY INTEGRATION

CROSS REFERENCE TO RELATED APPLICATIONS

This application claims the benefit of U.S. Provisional Application Ser. No. 60/558,637, filed Mar. 31, 2004, entitled "Video-Telephony Integration", the inventors being David R. Burritt, Matt Jerome Stevens, and Roger L. Toennis, the entire disclosure of which is hereby incorporated herein by reference.

FIELD OF THE INVENTION

The present invention is directed to integrating audio and video communications. In particular, the present invention relates to providing integrated video-telephony capabilities, without requiring modifications to a conventional telephony server or switch.

BACKGROUND OF THE INVENTION

Telephony systems allowing voice communications between remote users have been available for many years, and provide a common means of communication. Communications systems that provide video capabilities have also been developed. For example, systems that allow voice and video data to be transmitted using conventional telephone lines have been developed. Furthermore, with the development of high speed Internet connections, video communications systems using Internet Protocol (IP) communication channels have been developed. However, the actual use of such systems has been limited.

Systems allowing video and audio data to be transmitted across conventional telephone lines require that the communication end points each have compatible video telephone devices. In addition, the private branch exchange (PBX) or public switched telephone network (PSTN) end office switch used for such communications must be upgraded as compared to conventional audio only switches, in order to handle combined video and audio data streams. Accordingly, specialized infrastructure is required. In addition, the video telephones required have been expensive, and the quality of the video component has been limited.

Video telephones that make use of Internet connections, rather than the public switched telephone network, have also been developed. Like video telephones that make use of the PSTN, video telephones for use in connection with the Internet require that all of the endpoints to a communication have compatible equipment. In addition, such devices have typically been personal computer based, and require that a caller provide the Internet address of the endpoint being contacted. Accordingly, such systems are not as convenient for a user as conventional audio telephones, and have been difficult to set up and use.

More recently, systems that use an IP type connection for transmitting integrated audio and video and that allow connections to be established using a telephone number have been developed. According to such systems, a user can initiate audio-video communications by dialing the telephone number associated with an endpoint having integrated video-telephony capabilities. However, communications servers used in connection with such systems must be specially equipped to handle combined audio-video communications. In addition such combined audio and video IP telephony systems have been difficult to set up. Accordingly, deployment of such systems has been limited by the complexity and cost involved.

SUMMARY OF THE INVENTION

The present invention is directed to solving these and other problems and disadvantages of the prior art. According to embodiments of the present invention, an integrator application is provided as part of a user device to integrate the operation of a telephone with the operation of a video device. Accordingly, the operation of a conventional telephone can be integrated with the operation of video communication facilities, without requiring the use of specialized telephony switches.

In accordance with further embodiments of the present invention, the integrator application associated with an endpoint may operate automatically to establish video communications in connection with the establishment of an audio communication channel with another endpoint having video communication capabilities. In particular, the integrator application may have access to or be provided with information indicating that an endpoint in audio communication with a telephone of the endpoint associated with the integrator application has video capabilities. The integrator application may then operate to establish video communications. In accordance with embodiments of the present invention, information related to the capabilities of a dialed endpoint may be obtained by querying a central dial plan server, or by querying a table stored locally. In accordance with further embodiments of the present invention, information regarding the video capabilities of a dialed endpoint may be provided through the initiating endpoint in response to the establishment of audio communications between the endpoints.

In accordance with embodiments of the present invention, endpoints to a video-telephony communication session include a telephone, a video camera, and a video display. In addition, an endpoint includes an integrator application running on a platform that is integrated with or interconnected to the telephone, video camera, and video display. The telephone may comprise a stand alone telephone providing a computer telephony integration (CTI) interface, a stand alone IP soft phone, or an IP soft phone implemented through or in connection with a computer platform. The video camera may be provided as a peripheral to a computing platform. Similarly, the video display may be provided as a peripheral to a computing platform. In a typical implementation, the integration application is provided as software running on a computing platform, such as the platform to which the video camera and video display are interconnected.

A system in accordance with embodiments of the present invention makes use of one or more communications networks. In particular, the audio portions of a communications session may be carried by a communication channel established across a communications network between audio gateways or switches local to the communication endpoints. Similarly, video communications may be carried over a video channel established across a communications network between network routers and/or switches local to each of the video-enabled communication endpoints. The separate audio and video communication channels may be established over the same communications network or over different communication networks.

Additional aspects of embodiments of the present invention will become more readily apparent from the following description, particularly when taken together with the accompanying drawings.

DETAILED DESCRIPTION

Figure 1:
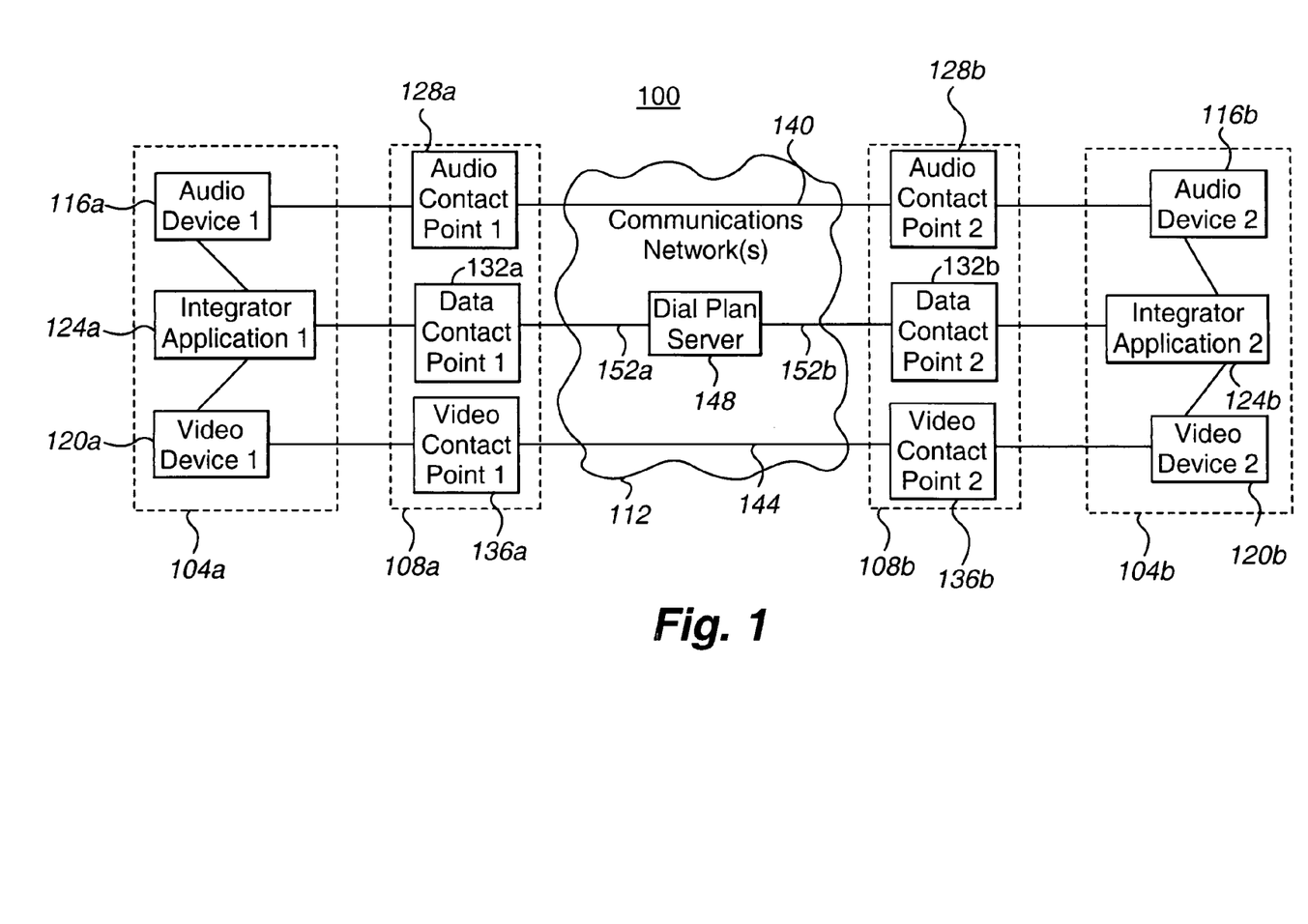
FIG. 1 is a block diagram depicting components of a communication system in accordance with embodiments of the present invention.

With reference now to FIG. 1, a communication system 100 in accordance with embodiments of the present invention is depicted. The communication system 100 generally includes a number of communication devices or endpoints 104 (e.g., first communication endpoint 104a and second communication endpoint 104b). Each communication device 104 may be interconnected to a network contact point 108, allowing communication devices 104 to communicate with one another across one or more communication networks 112.

In general, each communication device 104 may include an audio communication device 116 and a video communication device 120. In addition, one or both of the communication devices 104 may include an integrator application 124. As will be described in greater detail elsewhere herein, the integrator application 124 associated with a communication device 104 generally functions to coordinate the operation of an audio device or system 116 with the operation of an otherwise separate video device or system 120. In particular, the integrator application 124 operates to provide integrated video telephony functionality to a communication device 104.

The communication network contact points 108 may each include a number of separate contact points for interconnecting to different communication networks 112 and/or for use with different types of communication channels. For example, a communication network contact point 108 may include an audio contact point 128, a data contact point 132, and a video contact point 136. In general, a communication network contact point 108 may provide different routers and/or switches necessary to support communications or the exchange of data by devices or applications associated with a local communication device 104. Accordingly, where an audio device 116 associated with a communication device 104 is part of a private branch exchange (PBX), an audio contact point 128 comprising a private branch exchange server may be provided. As a further example, where an audio device 116 associated with a communication device 104 comprises a conventional switched circuit telephone, the audio contact point 128 may comprise a telephone company end office switch. As still another example, the audio contact point 128 may comprise a gateway between a local area network to which an associated audio device 116 is interconnected, and a communication network 112 comprising a wide area network, such as the Internet. Similarly, the data contact point 132 may be determined by the type of communication network 112 over which data is transmitted. Accordingly, a data contact point 132 may comprise an IP network router. Similarly, the video contact point 136 local to a video device 120 may be determined by the network over which video communications or data is transmitted. Accordingly, an exemplary video contact point 136 comprises an IP network router. As can be appreciated by one of skill in the art from the description provided herein, the functions of the individual contact points 128, 132 and/or 136 described herein can be combined in one or more shared devices. For example, in an exemplary embodiment, a communication device 104 using an audio device 116 comprising a telephone that is part of a private branch exchange, a video device 120 running on a general purpose computer, and an integration application 124 that makes use of data stored on a central dial plan server may operate in connection with a network contact point 108 that includes an audio contact point 128 comprising a private branch exchange server and a data contact point 132 and video contact point 136 that are both implemented as part of a single IP network router.

The communications network 112 may comprise one or more networks of one or more types. For example, the communications network 112 may comprise a packet data network, or a combination of packet data and switched circuit networks. As a further example, the communication network 112 may comprise the Internet, an intranet, or a combination of one or more intranets and the Internet. As depicted in FIG. 1, a number of communication and data channels may be established across the communications network or networks 112. In particular, separate audio 140 and video 144 communication channels may be established across the communications network or networks 112. In addition, a communications network 112 may include or be interconnected to a central authority, such as a dial plan server 148. Furthermore, the communications network or networks 112 may support transfers of data between an integrator application 124, and the dial plan server 148 over a data channel 152 as will be described in greater detail elsewhere herein.

Figure 2:
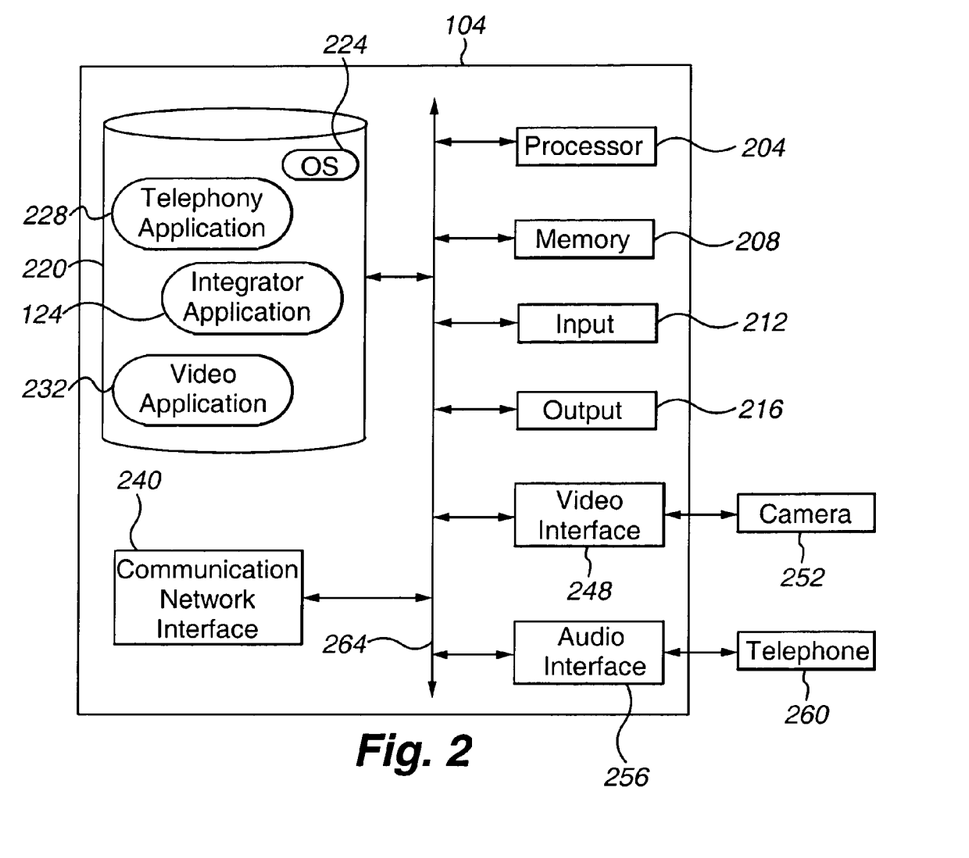
FIG. 2 is a block diagram depicting a communication endpoint in accordance with embodiments of the present invention.

With reference now to FIG. 2, components of a communication device or endpoint 104 in accordance with embodiments of the present invention are depicted. In general, a communication device 104 may include a processor 204 capable of executing program instructions. Accordingly, the processor 204 may include any general purpose programmable processor or controller for executing application programming. Alternatively, the processor 204 may comprise a specially configured application specific integrated circuit (ASIC). The processor 204 generally functions to run programming code implementing various of the functions performed by the communication device 104, including telephony, video communications, and video-telephony integrator applications as described herein.

A communication device 104 may additionally include memory 208 for use in connection with the execution of programming by the processor 204, and for the temporary or long term storage of data or program instructions. The memory 208 may comprise solid state memory, such as DRAM and SDRAM. Where the processor 204 comprises a controller, the memory 208 may be integral to the processor 204. In addition, a communication device 104 may include various input devices. For example, input devices 212 may include a keyboard and a pointing device. The communication device 104 may also include various output devices. For example, the communication device 104 may include a video display.

A communication device 104 may also include data storage 220 for the storage of application programming and data. For example, operating system software 224 may be stored in the data storage 220, as well as a telephony application 228. In accordance with embodiments of the present invention, the telephony application 228 may operate to provide voice telephony functions. For example, the telephony application 228 may comprise an IP soft phone implemented in connection with hardware provided by the communication device 104. As another example, the telephony application 228 may comprise an application for monitoring the operating status of a telephone 260 interconnected to the communication device 104 and for obtaining information from the telephone 260, such as a dialed number. A video application 232 that is separate from the telephony application 228 may also be stored in data storage 220. In accordance with embodiments of the present invention, the video application 232 operates in connection with a video camera 252 and video display 216 provided by the communication device 104 to send and receive video communications. Furthermore, an integrator application 124 may be stored in the data storage 220. The integrator application 124 generally functions to monitor the operation of the telephony application 228, and to initiate the operation of the video application 232 so as to provide video communications when video is supported by another communication endpoint or device 104 in communication with the endpoint 104 on which the integrator application 124 is installed. The data storage 220 may comprise a magnetic storage device, a solid state storage device, an optical storage device, a logic circuit, or any combination of such devices. It should further be appreciated that the programs and data that may be maintained in the data storage 220 can comprise software, firmware or hardwired logic, depending on the particular implementation of the data storage 220.

A communication device 104 may also include one or more interfaces. For example, a communication device 104 may include a communications network interface 240 through which an interconnection between the communication device 104 and one or more communications networks 112 may be established, for example via a network contact point 108. Accordingly, a communications network interface or interfaces 240 may be of a type required by an interconnected contact point 108 or by the communications network 112 itself. Other interfaces may be provided for interconnecting the communication device 104 to peripheral devices. For example, a video interface 248 may be provided for interconnecting a communication device 104 to a video camera 252. As can be appreciated by one of skill in the art, a video interface 248 may comprise a standardized interface, such as a universal serial bus (USB) interface or an IEEE 1394 interface. An audio interface 256 may also be provided for interconnecting a communication device 104 to a telephone 260. For example, where the telephone 260 is a full featured, conventional telephone, the audio interface 256 may comprise a computer telephony integration (CTI) interface. As a further example, where the telephone 260 is implemented as part of soft telephone features provided by the communication device 104, the audio interface 256 may comprise the sound card for sending and receiving analog audio data to the speaker and from the microphone of the telephone 260 hand set. As yet another example, the audio interface 256 may comprise a standardized interface, such as a USB or IEEE 1394 interface. An internal bus 264 is generally provided to permit the exchange of instructions and data between the various components of the communication device 104.

Figure 3:
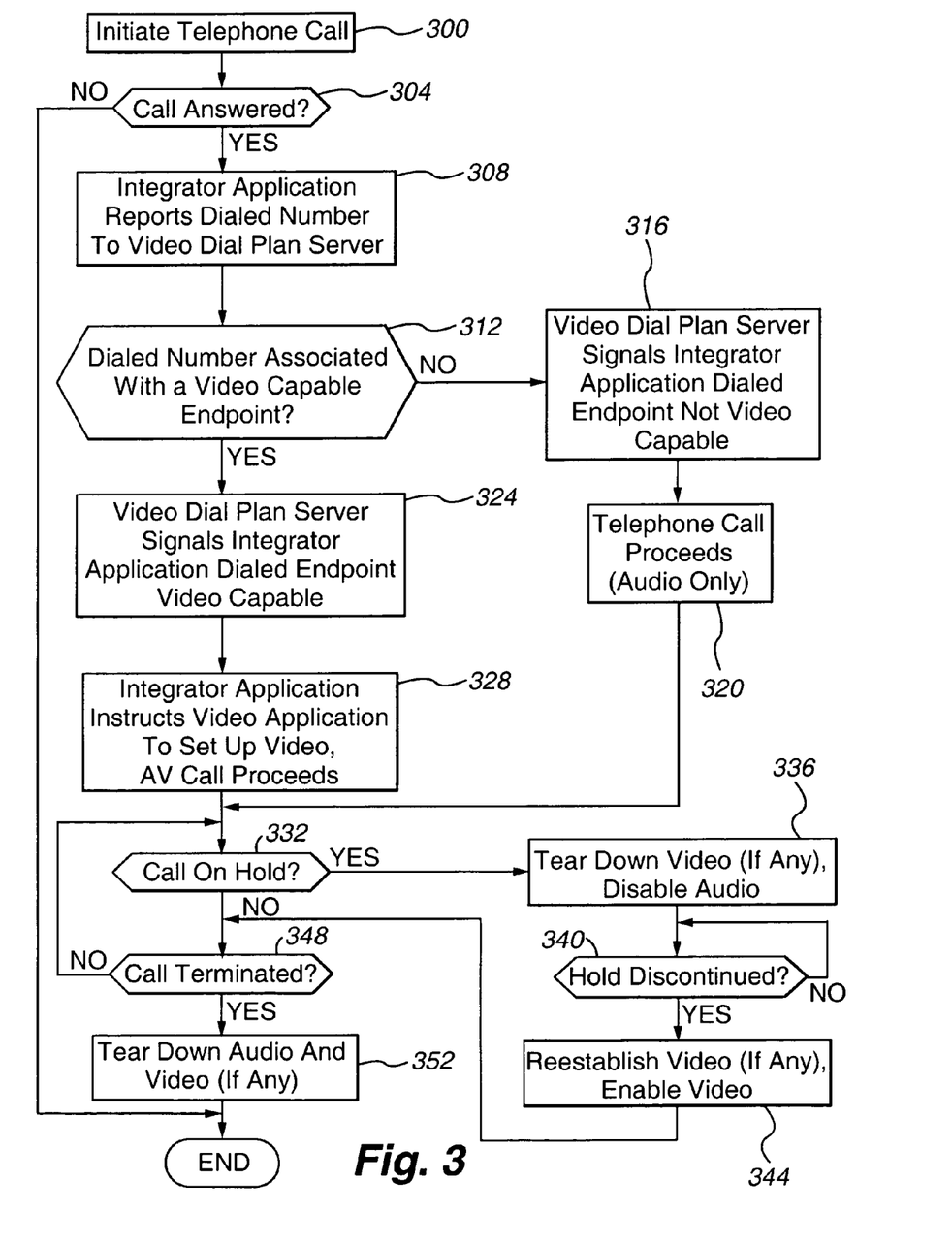
FIG. 3 is a flowchart illustrating the operation of a system in accordance with embodiments of the present invention.

With reference now to FIG. 3, the operation of a system providing video-telephony integration in accordance with embodiments of the present invention is illustrated. Initially, at step 300, a telephone call is initiated by a user of a first communication device 104a and an audio communication channel 140 is established. The user may initiate a telephone call to a second communication device 104b by, for example, entering the telephone number of the second communication device 104b using a telephone 260 associated with the first communication device 104a. As another example, where a telephony function is provided as part of a soft telephone, the user may initiate a telephone call by entering a telephone number using an input device 212 associated with the first communication device 104a. At step 304, a determination is made as to whether the call has been answered. If the call is not answered, the process ends.

If the call is answered, the integrator application 124a running on the first communication device 104a contacts the video dial plan server 148 and reports the dialed number (step 308). In particular, the integrator application 124a may establish a connection with the dial plan server 148 through a data contact point 132a. As can be appreciated by one of skill in the art from the description provided herein, the integrator application 124a may obtain the dialed number from data passed to it by the telephony application 228. At step 312, a determination is made as to whether the dialed number is associated with a video capable endpoint 104. That is, the dial plan server 148 performs a lookup using the telephone number provided by the integrator application 124a, to determine whether that number is associated with a video capable endpoint or communication device 104. If the called number is not associated with a video capable communication device, the video dial plan server 148 signals the integrator application 124a that the dialed endpoint is not video capable (step 316). The telephone call then proceeds normally (i.e., as an audio only communication) (step 320). Furthermore, it should be appreciated that the functioning of the integrator application 124a with respect to the telephone call then in progress can end once a signal from the video dial plan server 148 indicating that the contacted communication endpoint is not video capable has been received.

If the dialed number is associated with a video capable endpoint or communication device 104, the video dial plan server 148 signals the integrator application 124a that video communications can be enabled (step 324). The integrator application 124a then instructs the video application 232 associated with the first communication device 104a to set up a video communication channel 144 (step 328). In order to set up a video communication channel 144, the integrator application 124a may pass an IP address associated with the video capabilities of the second communication device 104b to the video application 232 running on the first communication device 104a. In accordance with embodiments of the present invention, the IP address for video communications with the second communication device 104b may be provided by the dial plan server 148 as part of the signal provided to the integrator application 124a indicating that video communications are supported. When a video call placed by the first communication device 104a is received at the second communication device 104b, the integrator application 124b running on the second communication device 104b, may answer the video call. For example, in response to receiving a video call or a request to establish a video call, the integrator application 124b may activate the video device 120b to enable video communications and to establish a video communication channel 144. After the video communication channel 144 has been established, video signals may be exchanged between the communication devices 104. Accordingly, the user of the first communication device 104a receives a video signal from the video device 120b associated with the second communication endpoint 104b, together with an audio signal from the audio device 116b associated with the second communication endpoint 104b. Similarly, the user of the second communication device 104b receives a video signal from the video device 120a associated with the first communication device 104a together with the audio signal from the audio device 116a associated with the first communication device 104a. Furthermore, as described herein, the audio signals are carried by an audio communication channel 140, and the video signals are carried by a video communication channel 144 that is separate from the audio communication channel 140. Accordingly, embodiments of the present invention provide an integrated video-telephone communication session using separate audio 140 and video 144 communication channels.

After an integrated video-telephone communication session has been established at step 328, or after an audio only telephone call has been established at step 320, a determination is made as to whether the call has been placed on hold (step 332). If the call has been placed on hold, the video connection or communication channel 144 (if any) is torn down and the audio is muted (step 336). In particular, if the integrator application 124 receives a signal indicating that the call is on hold, for example in response to a hold button being pushed on a telephone 260 or a hold command being entered through a keyboard 212, the integrator application 124 will signal the video application 232 to tear down the video connection, if one was established. In accordance with embodiments of the present invention, the telephony application 228 (or the telephone 260 if implemented as a hard phone) will receive the mute indication directly, and provide an indication of the mute to the integrator application 124. A determination is then made as to whether the hold has been discontinued (step 340). If the hold has not been discontinued, the process may idle at step 340. If it is determined that the hold has been discontinued, any video communication channel may be reestablished, and audio functions are again enabled (step 344).

After determining that the call has not been placed on hold at step 332, or after reestablishing audio and any video functions at step 344, a determination is made as to whether the call has been terminated (step 348). If the call has not been terminated, it may be continued, and the process may return to step 332. If the call has been terminated, the audio connection and any video connection is torn down (step 352) and the process ends. As can be appreciated by one of skill in the art from the description provided herein, various of the steps described in connection with FIG. 3 can be performed at different times and/or in different orders.

Figure 4:
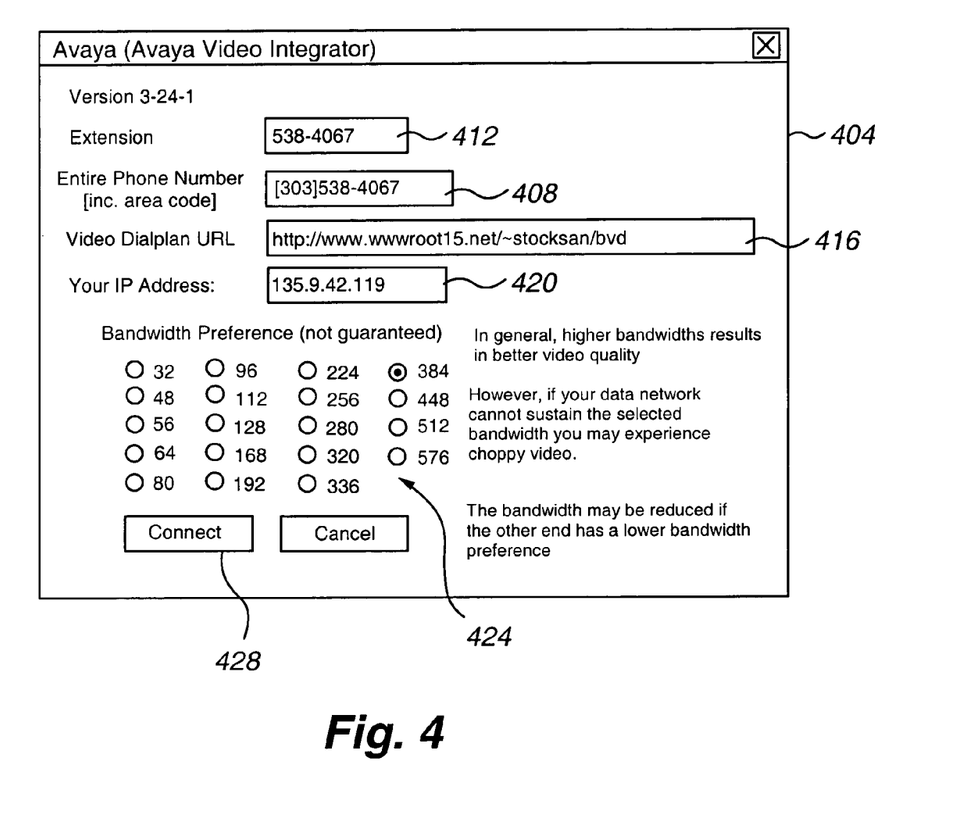
FIG. 4 is a screenshot of an integration application initialization screen in accordance with embodiments of the present invention.

With reference now to FIG. 4, a screenshot of an integrator application 124 initialization screen 404 is illustrated. The integrator application 124 initialization screen 404 allows a user of a communication device 104 to report information regarding the video capabilities of the communication device 104 to a central dial plan server 148. Accordingly, the setup screen 404 provides a field for entering the telephone number 408 of the audio device 116 associated with the communication device 104. A telephone extension field 412 may also be provided. A video dial plan URL field 416 may be provided so that a user can specify the dial plan server 148 that is to receive the information. In order to enable video communications, and in particular video communications initiated by a video device 120 associated with another communication device 104, an IP address field 420 is provided. Bandwidth preference selector buttons 424 may be provided to allow a preferred bandwidth for communications involving the communication device 104. After entering information or making selections in the various fields 408-424, a user may select the connect button 428 to send the information to the indicated dial plan server 148. Upon receiving information, the dial plan server 148 may create a record (or update an existing record) for the communication device 104. The provided information may be used to indicate to other communication devices 104 that the communication device 104 associated with the information is video capable. The video communication device 104 may be identified by the associated phone number entered in the phone number field 408. In particular, the phone number of the communication device 104 may be submitted to the dial plan server 148 as part of a query for information regarding the video capabilities of the communication device 104. In response to a query with respect to a communication device 104 that is video capable and whose information has been stored in the video dial plan server 148, the IP address for the communication device 104 is returned. Accordingly, a separate video communication channel 144 may be established in addition to the audio communication channel 140, creating an integrated video-telephone communication session.

In accordance with embodiments of the present invention, the information maintained by the video dial plan server 148 may be changed as the capabilities associated with the telephone number of a communication device 104 change. For instance, where the telephone number of a communication device 104 relates to a cellular telephone, video capabilities provided by a user's desktop computer may not always be available. Accordingly, the stored information related to the capabilities of the communication device 104 may be updated as the availability of video capabilities change.

Although certain described embodiments of the present invention operate such that video communications between video-capable communication devices are established after an audio call is answered, the present invention is not so limited. For example, in accordance with embodiments of the present invention, a video communication session can be established as soon as a query to a dial plan server 148 indicates that the contacted communication device 104 is video enabled. In accordance with other embodiments of the present invention, prior to initiating an audio communication session, a video communication session can be established. For instance, a user could initiate a video communication session to see if the party to be contacted is at their video enabled communication device 104. If the party is present, an audio communication session could then be established. In accordance with still other embodiments of the present invention, information regarding the video capabilities of communication devices 104 may be stored locally with respect to an initiating communication device 104.

The foregoing discussion of the invention has been presented for purposes of illustration and description. Further, the description is not intended to limit the invention to the form disclosed herein. Consequently, variations and modifications commensurate with the above teachings, within the skill and knowledge of the relevant art, are within the scope of the present invention. The embodiments described hereinabove are further intended to explain the best mode presently known of practicing the invention and to enable others skilled in the art to utilize the invention in such or in other embodiments and with various modifications required by their particular application or use of the invention. It is intended that the appended claims be construed to include the alternative embodiments to the extent permitted by the prior art.

What is claimed is:

1. A computational component for performing a method, the method comprising:

in response to an initiation of a telephony communication between a first communication endpoint and a second communication endpoint over a first communication channel, determining whether said second communication endpoint is video communication enabled, wherein said first communication endpoint is video enabled, wherein the first communication endpoint includes a telephone functionality that does not itself provide any video functionality, a video functionality that is separate from said telephony functionality, and a first integrator application, wherein the second communication endpoint includes a telephony functionality that does not itself provide any video functionality, a video functionality that is separate from said telephony functionality, and a second integrator application, wherein said determining whether said second communication endpoint is video communication enabled is performed by said first integrator application; and in response to determining that said second communication endpoint is video enabled, said first integrator application initiating a video communication between said first communication endpoint and said second communication endpoint over a second communication channel, and said second integrator application activating a video device associated with the second communication endpoint.

2. The method of claim 1, wherein said initiating a telephony communication comprises establishing audio telephony communications between said first communication endpoint and said second communication endpoint.

3. The method of claim 1, wherein said initiating a telephony communication comprises dialing a telephone number associated with said second communication endpoint.

4. The method of claim 1, wherein said determining whether said second communication endpoint is video communication enabled comprises contacting a central authority, wherein said central authority returns an address for video communication associated with a second communication endpoint that is video communication enabled.

5. The method of claim 4, wherein said central authority comprises a central dial plan server.

6. The method of claim 4, wherein said address for video communication comprises an Internet protocol address associated with said second communication device.

7. The method of claim 1, wherein said second communication endpoint initiates said telephony communication.

8. The method of claim 1, wherein said first communication endpoint includes a general purpose computer and a telephone interconnected to said general purposed computer.

9. The method of claim 1, wherein said first communication endpoint includes a general purpose computer running application programming implementing a soft telephone.

10. The method of claim 1, wherein said computational component comprises a computer readable storage medium containing instructions for performing the method.

11. The method of claim 1, wherein said computational component comprises a logic circuit.

12. A method for enabling video-telephony integration, comprising:

initiating an audio communication between first and second communication endpoints over an audio communication channel;

determining by a first integrator application running on said first communication endpoint whether both of said first and second endpoints are video capable; and in response to determining that both of said first and second endpoints are video capable, establishing a video communication channel between said first and second communication endpoints, wherein said video communication channel is separate from said audio communication channel, and wherein the video communication capability of said second endpoint is activated by a second integrator application running on said second communication endpoint.

13. The method of claim 12, wherein an audio communication capability of said first communication endpoint is provided in connection with an audio application and wherein a video communication capability of said first communication device is provided in connection with a video application, and wherein said audio application is separate from said video application.

14. The method of claim 13, wherein an integrator application at least one of monitors and receives information from said audio application, and wherein said integrator application instructs said video application to provide video communication functions in response to said determining that both of said first and second communication endpoints are video capable.

15. The method of claim 12, wherein said determining whether both of said first and second endpoints are video capable comprises contacting a communication authority.

16. The method of claim 15, wherein said communication authority maintains data regarding video communication capabilities and addresses associated with communication endpoints.

17. The method of claim 15, wherein an integrator application establishes a data communication channel between said first communication endpoint and said communication authority.

18. The method of claim 12, wherein said video communication channel does not carry audio data.

19. A video and telephony system, comprising:

a video dial plan record;

a first communication device, including:
  a first telephony device;
  a first telephony application associated with said first telephony device;
  a first video device;
  a first video application associated with said first video device;

a first integrator application, wherein said first integrator application queries said video dial plan record in response to an indication from said first telephony application that a telephone communication has been established with a second communication device for information regarding video capabilities of said second communication device, and wherein said first integrator application causes said first video application to establish video communication with said second communication endpoint in response to receiving an indication from said video dial plan record that said second communication device is video capable, and wherein said telephone communication is carried by a channel that is separate from a channel carrying said video communication;

a second communication device, including:
  a second telephony device;
  a second telephone application associated with said second telephony device;
  a second video device;
  a second video application associated with said second video device;
  a second integrator application, wherein said second integrator application activates said second video application in response to said first integrator application causing said first video application to establish video communication with said second communication endpoint.

20. The system of claim 19, further comprising:
at least a first communications network;
a second communication device, wherein an audio communication channel is established between said first communication device and said second communication device over said first communication network, and wherein a video communication channel is established over one of said first communication network and a second communication network.

21. The system of claim 20, wherein a communication channel is established between said first communication and said video dial plan record.

22. An integrated video-telephony system, comprising:
communication network means;
first communication endpoint means including:
  first means for supporting audio communications;
  first means for supporting video communications;
  first means for integrating operation of said first means for supporting audio communications and said first means for supporting video communications, wherein said means for integrating cause said first means for supporting video communications to establish a video communication channel to complement a separate audio communication channel;
second communication endpoint means, including:
  second means for supporting audio communications;
  second means for supporting video communications;
  second means for integrating operation of said first means for supporting audio communications and said first means for supporting video communications, wherein said first means for integrating establishes said video communication channel to complement a separate audio communication channel, wherein said audio communication channel is established between at least two communication endpoint means that each have video communication capabilities, and wherein said second means for integrating activates said second means for supporting video communications in response to said first means for integrating establishing said video communication channel.

23. The system of claim 22, further comprising:
means for storing communication device video capability data.

24. The system of claim 22, wherein said means for supporting audio communications comprise a telephony application and a telephone.

25. The system of claim 22, wherein said means for supporting video communications comprise a video application, a video camera, and a video display.

26. The system of claim 22, further comprising means for interconnecting to a communication network, wherein said audio communication channel and said video communication channel are established through said means for interconnecting to a communication network.

* * * * *